United States Patent [19]
Nemoto

[11] 4,368,965
[45] Jan. 18, 1983

[54] PHOTOMETRIC ASSEMBLY FOR CAMERA
[75] Inventor: Kazuyuki Nemoto, Hachioji, Japan
[73] Assignee: Olympus Optical Company Ltd., Tokyo, Japan
[21] Appl. No.: 253,722
[22] Filed: Apr. 13, 1981
[30] Foreign Application Priority Data
  Jul. 7, 1980 [JP] Japan .................. 55-92401
[51] Int. Cl.³ .............................. G03B 7/08
[52] U.S. Cl. ................................ 354/23 R
[58] Field of Search ............ 354/55, 56, 59, 60, 354/23 R, 31, 38, 42, 49, 51
[56] References Cited
  U.S. PATENT DOCUMENTS
  2,184,016 12/1939 Mihalyi .......................... 354/49
  3,315,581 4/1967 Rühle et al. ...................... 354/55
  3,791,276 2/1974 Ueda et al. ..................... 354/23 R
  3,846,805 11/1974 Kiyohara et al. ................ 354/23 R
  4,170,410 10/1979 Sekida et al. ................... 354/23 R
  4,172,643 10/1979 Schulz et al. ................... 354/23 R Primary Examiner—Donald A. Griffin
Attorney, Agent, or Firm—Weinstein & Sutton

[57] ABSTRACT

A photometric assembly of the reflective photometry type is provided in which light passing through a taking lens and reflected by a blind surface of a shutter or a film surface is directed by a reflecting member so as to be incident on a photometric, photoelectric transducer element disposed on a printed circuit board. A shield member is disposed to prevent the direct incidence of the reflected light from the blind surface or the film surface onto the transducer element.

9 Claims, 2 Drawing Figures

PHOTOMETRIC ASSEMBLY FOR CAMERA

BACKGROUND OF THE INVENTION

The invention relates to a photometric assembly for a camera, and more particularly, to a photometric assembly for use in a camera of the reflective photometry type in which light from an object being photographed which passes through a taking lens is reflected by a film surface or the surface of a shutter blind of a focal plane shutter and is guided by a reflecting member to impinge on a photoelectric transducer element which is provided for the purpose of photometry.

In a camera utilizing a focal plane shutter, and in particular, in a single lens reflex camera of the reflective photometry type in which light reflected from the surface of a first shutter blind or a film surface is determined, a reflecting member is utilized to direct the reflected light to a photoelectric transducer element which is disposed in the bottom of a dark box for the purpose of photometry. A reflective photometry assembly can be provided which is responsive to the amount of light received by the element for effecting a control to provide a proper exposure. When such an assembly is constructed, the transducer element and an IC chip which forms an exposure control circuit can be formed as one integral package which may be directly disposed on a printed circuit board. This avoids the need to route a signal current from the transducer element which has a minimal magnitude to spaced or remote points, thus eliminating the likelihood of malfunctioning in response to extraneous noises or a breaking of lead wires. The incorporation of the transducer element and the IC chip into an integral unit reduces the cost and the space requirement, affording the advantage of allowing an effective utilization of the available space.

However, a point with this assembly is the fact that only the light which is reflected by the reflective member must be directed to impinge on the transducer element. If the light reflected by the blind surface or the film surface directly impinges on the transducer element if the proportion is small, the distribution of light receiving sensitivity is disturbed, preventing an accurate photometry. Consequently, it is necessary to provide a shield member or members which prevent a direct impingement of the reflected light from the blind or the film surface onto the transducer element. However, when shielding the reflected light from the film surface which directly impinges on the transducer element, the impingement of the light from the reflecting member onto the transducer element must not be intercepted or otherwise an accurate photometry is again prevented. In addition, the provision of the shield member involves the likelihood that a reduced magnitude of a photometric output may degrade the performance of an associated camera. Hence, it is important that the shield member be located so as to reliably prevent the direct impingement of the reflected light from the blind or the film surface without intercepting the incident light from the reflecting member.

SUMMARY OF THE INVENTION

It is an object of the invention to provide a photometric assembly for a camera including a shield member which is located over a light receiving surface of a photometric, photoelectric transducer element so that only the direct impingement of the reflected light from a blind or a film surface onto the transducer element is prevented without intercepting the incidence of light from a reflecting member onto the transducer element.

In accordance with the invention, the shield member permits the reflected light from the film surface and as relayed by the reflecting member to impinge properly on the transducer element while the direct incidence of the reflected light from the film surface onto the transducer element is reliably intercepted, thus assuring a correct distribution of light receiving sensitivity of the photometric assembly.

DESCRIPTION OF PREFERRED EMBODIMENT

Figure 1:
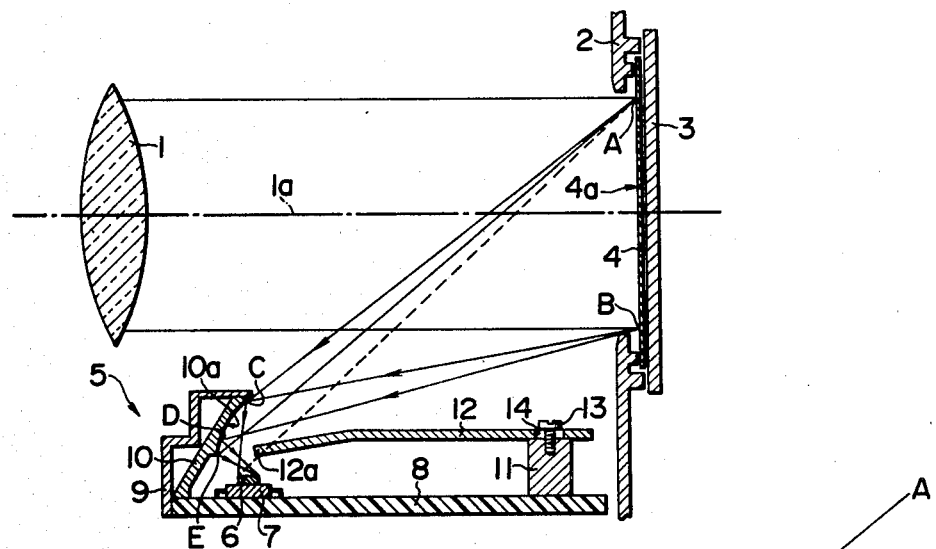
FIG. 1 is a cross section of a photometric assembly for camera according to one embodiment of the invention.

Referring to FIG. 1, a photometric assembly according to an embodiment of the invention is shown in cross section. An optical image which is reflected from an object being photographed impinges on a camera through a taking lens 1. A photographic film 4 is held between a camera body 2 and a film pressure plate 3 and has an image field 4a which is hereafter referred to as a film surface. The optical image is projected onto a reflecting surface of a first blind, not shown, of a shutter and the image field or film surface 4a which is centered about the axis 1a of the lens 1. A photometric assembly 5 is located below the taking path so as to avoid an interference therewith. It includes a photoelectric transducer element 6 which actually effects photometry and which is integrally disposed on the upper surface of an IC package 7 which includes a photocurrent amplifier circuit. It will be noted that the package 7 is placed on a printed circuit board 8 which extends parallel to the optical axis 1a. A reflecting member 10 having a reflecting surface 10a is disposed at an angle on the lateral end of the circuit board 8 which is located nearer the taking lens 1. Except for the reflecting surface 10a, the reflecting member 10 is enclosed by a light shielding cover 9. The reflecting surface 10a is formed in the upper half of the reflecting member 10 and is formed as a spherical surface of a curvature which receives the reflected light from the entire film surface 4a and to direct its entirety toward the light receiving surface of the transducer element 6.

A support member 11 in the form of a post is mounted on the end of the circuit board 8 located toward the film surface, and one end of a shield member 12 in the form of an elongate strip is mounted on the support member 11 by means of an adjusting screw 13. The shield member 12 has a sufficient length such that its other end 12a reaches a location over the light receiving surface of the transducer element 6, and the shield member 12 generally extends in parallel relationship with the optical axis 1a of the taking lens 1. It will be noted that a slot 14 which is elongate in a direction parallel to the optical axis is formed in the end of the shield member 12 where it is mounted, thus allowing an adjustment of the position of the shield member 12 in a direction parallel to the optical axis 1a.

Figure 2:
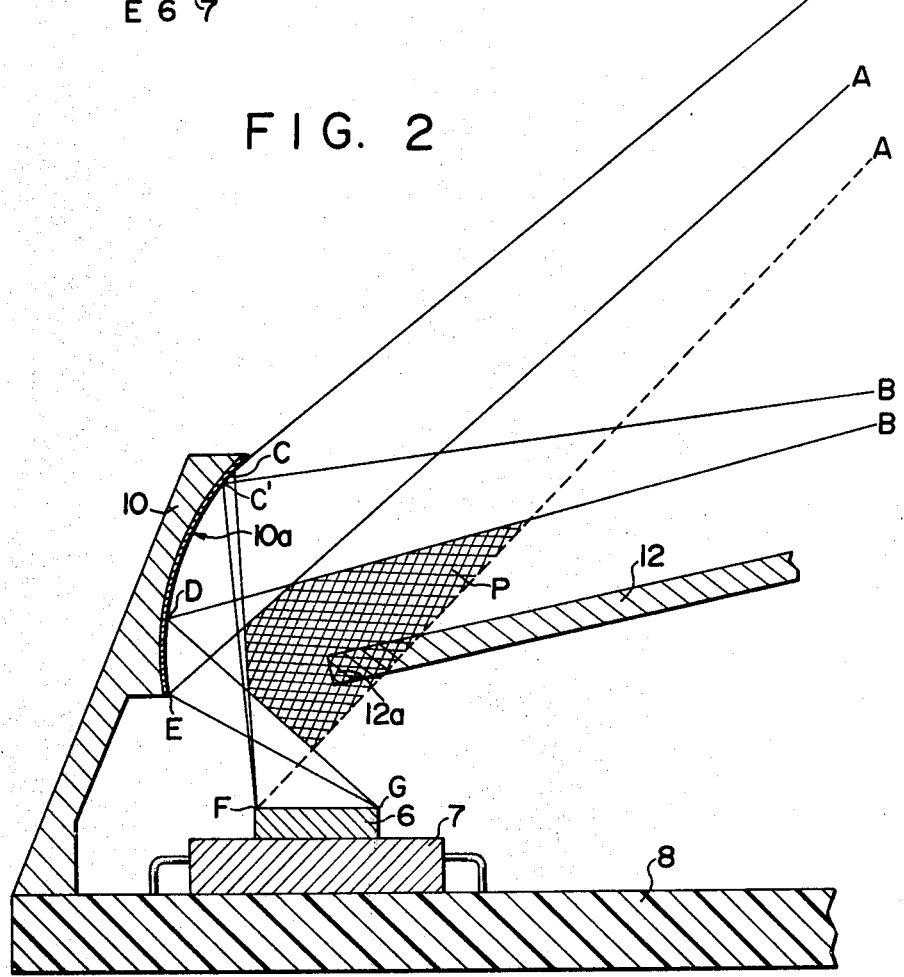
FIG. 2 is an enlarged cross section of part of the photometric assembly shown in FIG. 1.

When an optical image of an object being photographed which passes through the taking lens 1 is projected onto the film surface 4a, the light which is reflected by the film surface 4a at an uppermost point A thereon is reflected by the reflecting surface 10a of the reflecting member 10 at an uppermost and a lowermost point C, E thereof, and then impinges on the light receiving surface of the transducer element 6 at points F, G which are located at one end and the other end thereof (see FIG. 2). The light reflected from the film surface 4a at the point A and impinging on the reflecting member 10 intermediate the points C and E will obviously be incident on the entire light receiving surface of the transducer element 6 which is located between the points F and G. Similarly, the light which is reflected by the film surface 4a at the lowermost point B thereon is reflected by the reflecting surface 10a of the reflecting member 10 at an upper and a lower point C′, D thereof and is then incident on the light receiving surface of the transducer element 6 at points F and G, respectively. Again, the reflected light from the film surface 4a which is reflected at the point B and incident on the reflecting member 10 at locations intermediate the points C and D will obviously be incident on the entire light receiving surface of the transducer element 6 which is located between the points F and G.

Since an interference of the free end 12a of the shield member 12 with the path of the reflected light from the film surface 4a which impinges on the transducer element 6 after reflection by the reflecting member 10 must be avoided, it is seen that the free end 12a must be located in a region which is disposed to the right of the light paths ACF, AEG, BC′F and BDG. Simultaneously, the direct impingement of the reflected light from the film surface 4a onto the transducer element 6 without experiencing a reflection by the reflecting member 10 must be prevented. Accordingly, part of the shield member 12 must be positively disposed to the left of a boundary line AF which joins the point A on the film surface 4a and the point F on the light receiving surface of the transducer element 6 in order to prevent the direct impingement of the reflected light upon the full surface of the transducer element 6. This means that the free end 12a of the shield member 12 must be disposed in a region to the left of the boundary line AF.

From the foregoing description, it will be seen that the free end 12a of the shield member 12 must be disposed in a region P shown in FIG. 2. As long as the free end 12a of the shield member 12 is disposed within the region P, it is assured that the shield member 12 does not interfere with the incidence of the reflected light from the film surface 4a onto the transducer element 6 after its reflection by the reflecting member 10 while reliably intercepting the direct impingement of the reflected light from the film surface 4a onto the transducer element 6.

Accordingly, during the assembly, the location of the shield member 12 is adjusted in the direction of the optical axis so that the free end 12a enters the region P, and then it is fixed in position by tightening the screw 14 to the support member 11. In this manner, the shield member 12 is integrally connected to the circuit board 8, with its free end 12a located within the region P which is above the light receiving surface of the transducer element 6.

Since the extent of the region P is greatly limited, a design which requires the shield member to be fixed in position at a single point will require a high accuracy of the parts, resulting in an increased cost. However, when the location of the shield member 12 is adjustable during the assembly as illustrated in the embodiment, it is a simple matter to locate the free end 12a within the region P in a reliable manner.

As is recognized, a single lens reflex camera has a camera body which may be divided into two parts structurally, namely, a front panel portion on which a lens mount, mirror box and prism, etc., are mounted and a body portion which houses a shutter assembly and a film winding and rewind mechanism. It is preferred that the adjustment of the location of the shield member 12 be performed during a preassembly stage when the front panel portion and the body portion are separately assembled together, rather than being made after the assembly of the camera has been completed. Accordingly, the shield member 12 is attached to the front panel portion during an assembling operation when the circuit board 8 carrying the transducer element 6 thereon is mounted on the front panel portion. When the circuit board 8 is mounted on the body portion, the shield member 12 is also assembled to the body portion for simplifying the assembly.

What is claimed is:

1. A photometric assembly for a camera, comprising:
   a photoelectric transducer element disposed within a camera for the purpose of photometry;
   a reflecting member disposed out of a taking path in a camera for directing light from an object being photographed which passes through a taking lens and is reflected by a blind surface of a focal plane shutter or a film surface toward the transducer element, the reflecting member being disposed adjacent to the transducer element;
   and a shield member disposed at least partially above said transducer element in said camera for preventing a direct impingement of the light reflected from the blind surface or the film surface onto the transducer element so that only light directed from said reflecting member impinges said transducer element.

2. A photometric assembly according to claim 1 in which the shield member is disposed so that its location is adjustable in a direction parallel to the optical axis of the taking lens.

3. A photometric assembly according to claim 2 in which the shield member is mounted on a printed circuit board on which the transducer element is disposed.

4. A photometric assembly according to claim 2 in which the shield member is mounted on a camera body.

5. A photometric assembly according to claim 1 in which the transducer element is integral with an IC package which includes a photocurrent amplifier circuit.

6. A photometric assembly according to claim 1 in which the transducer element is disposed on a printed circuit board.

7. A photometric assembly for a camera, comprising:
   a photoelectric transducer element disposed within a camera for the purpose of photometry;
   a reflecting member disposed out of the taking path of said camera and adjacent to said transducer element, said reflecting member adapted to receive light from an object being photographed which light passes through a taking lens and is reflected by a blind surface of a focal plane shutter or a film surface onto said reflecting member; said reflecting member directing said received light to said transducer element; and
   a shield member disposed in said camera for preventing said light reflected from the blind surface or the film surface from impinging directly onto the transducer element so that only light directed from said reflecting member impinges said transducer element.

8. A photometric assembly according to claim 7 wherein said shield member is disposed between said taking path and said transducer element.

9. A photometric assembly for a camera, comprising:

a photoelectric transducer element disposed on a printed circuit board within a camera for the purpose of photometry;

said photoelectric transducer element being integral with an IC package which includes a photocurrent amplifier circuit;

a reflecting member disposed out of the taking path of said camera and adjacent to said transducer element, said reflecting member adapted to receive light from an object being photographed which light passes through a taking lens and is reflected by a blind surface of a focal plane shutter or a film surface onto said reflecting member; said reflecting member directing said received light to said transducer element; and a shield member disposed in said camera for preventing said light reflected from the blind surface or the film surface from impinging directly onto the transducer element so that only light directed from said reflecting member impinges said transducer element.

* * * * *